US009110600B1

(12) United States Patent
Brooker et al.

(10) Patent No.: US 9,110,600 B1
(45) Date of Patent: Aug. 18, 2015

(54) TRIGGERED DATA SHELVING TO A DIFFERENT STORAGE SYSTEM AND STORAGE DEALLOCATION

(75) Inventors: Marc J. Brooker, Seattle, WA (US); Kerry Q. Lee, Seattle, WA (US); Yan V. Leshinsky, Kirkland, WA (US); Jonathon E. B. Grieman, Vancouver (CA)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/424,290

(22) Filed: Mar. 19, 2012

(51) Int. Cl.
*G06F 3/06* (2006.01)
*G06F 11/14* (2006.01)

(52) U.S. Cl.
CPC .......... *G06F 3/0647* (2013.01); *G06F 11/1458* (2013.01); *G06F 3/0607* (2013.01); *G06F 11/1461* (2013.01)

(58) Field of Classification Search
CPC ............ G06F 11/1458; G06F 11/1461; G06F 17/30082; G06F 3/0631; G06F 3/0649; G06F 11/1456; G06F 11/1466; G06F 11/1469
USPC ......................................................... 711/162
See application file for complete search history.

(56) References Cited

U.S. PATENT DOCUMENTS

| | | | |
|---|---|---|---|
| 5,574,878 A | 11/1996 | Onodera et al. | |
| 6,463,509 B1 | 10/2002 | Teoman et al. | |
| 7,146,522 B1 | 12/2006 | Rowe et al. | |
| 7,895,261 B2 | 2/2011 | Jones et al. | |
| 8,280,853 B1 | 10/2012 | Lai et al. | |
| 8,285,687 B2 | 10/2012 | Voll et al. | |
| 2002/0059253 A1 | 5/2002 | Albazz et al. | |
| 2003/0191930 A1 | 10/2003 | Viljoen et al. | |
| 2004/0078419 A1 | 4/2004 | Ferrari et al. | |
| 2004/0260873 A1* | 12/2004 | Watanabe | 711/114 |
| 2005/0267950 A1* | 12/2005 | Kitamura | 709/219 |
| 2008/0005508 A1 | 1/2008 | Asano et al. | |
| 2008/0140905 A1 | 6/2008 | Okuyama | |
| 2009/0228889 A1 | 9/2009 | Yoshida | |

(Continued)

FOREIGN PATENT DOCUMENTS

WO 2011088261 7/2011

OTHER PUBLICATIONS

VMware; Carl Waldspurger; Memory Resource Management in WMware ESX Server; pp. 1-24, Dec. 10, 2002.

(Continued)

*Primary Examiner* — Mardochee Chery
(74) *Attorney, Agent, or Firm* — Robert C. Kowert; Meyertons, Hoods, Kivlin, Kowert & Goetzel, P.C.

(57) ABSTRACT

A data volume may be shelved based at least in part on statistical triggers associated with the data, a user of the data, or a system configured to store and/or manage the data. Upon receiving a request to detach a data volume from a computing device, a determination of whether the data volume should be shelved may be made. In some aspects, the data volume may be shelved by moving the data to another storage system, storing an identifier of the data volume, and de-allocating space associated with the shelved data such that the shelved data is no longer maintained in the storage system. Further, in some aspects, upon a request to attach the data volume, the data may be moved back, the original identifier may be re-assigned to the data volume, and the data volume may be re-attached to the computing device.

26 Claims, 9 Drawing Sheets

(56) References Cited

U.S. PATENT DOCUMENTS

| | | |
|---|---|---|
| 2009/0249470 A1 | 10/2009 | Litvin et al. |
| 2009/0307426 A1 | 12/2009 | Galloway et al. |
| 2010/0037009 A1 | 2/2010 | Yano et al. |
| 2010/0037031 A1 | 2/2010 | DeSantis et al. |
| 2010/0070725 A1 | 3/2010 | Prahlad et al. |
| 2010/0107015 A1 | 4/2010 | Bernabeu-Auban et al. |
| 2010/0191922 A1 | 7/2010 | Dickey et al. |
| 2010/0312983 A1 | 12/2010 | Moon et al. |
| 2011/0004735 A1 | 1/2011 | Arroyo et al. |
| 2012/0060006 A1* | 3/2012 | Paterson-Jones et al. .... 711/162 |
| 2012/0079221 A1 | 3/2012 | Sivasubramanian et al. |
| 2012/0254687 A1 | 10/2012 | Leggette et al. |
| 2012/0284712 A1 | 11/2012 | Nimmagadda et al. |
| 2013/0046966 A1 | 2/2013 | Chu et al. |
| 2013/0151683 A1 | 6/2013 | Jain et al. |

OTHER PUBLICATIONS

HP; Chris Hyser et al.; Autonomic Virtual Machine Placement in the Data Center; pp. 1-10, Feb. 26, 2008; HP Laboratories.

U.S. Appl. No. 12/892,742, filed Sep. 28, 2010, Swaminathan Sivasubramanian.

"Amazon EBS API and Command Overview", downloaded Jul. 11, 2013 from doc.aws.amazon.com/AWSEC2/latest/UserGuide/ebs-api-cli-overview.html, p. 1.

"AMI Basics" downloaded Jul. 11, 2013 from doc.aws.amazon.com/AWSEC2/latest/UserGuide/ComponentsAMIs.html, p. 1-2.

"AWS Amazon Elastic Block Store (EBS)—Persistent Storage" downloaded Jul. 11, 2013 from aws.amazon.com/ebs/, pp. 1-4.

"Cloudiquity" Published Mar. 12, 2009, Amazon Web Services and Cloud, pp. 1-4.

"Feature Guide: Elastic Block Store: Articles & Tutorials: Amazon Web Services" downloaded Jul. 11, 2013 from aws.amazon.com/articles/1667, pp. 1-7.

U.S. Appl. No. 14/028,186, filed Sep. 16, 2013, Marcin Piotr Kowalski.

U.S. Appl. No. 13/465,998, filed May 7, 2012, Marc J. Brooker.
U.S. Appl. No. 13/466,007, filed May 7, 2012, Marc J. Brooker.
U.S. Appl. No. 13/466,010, filed May 7, 2012, Marc J. Brooker.
U.S. Appl. No. 13/466,014, filed May 7, 2012, Marc J. Brooker.
U.S. Appl. No. 13/466,022, filed May 7, 2012, Marc J. Brooker.

* cited by examiner

TRIGGERED DATA SHELVING TO A DIFFERENT STORAGE SYSTEM AND STORAGE DEALLOCATION

BACKGROUND

Many data storage systems include one or more different types of memory architectures and/or implementations. For example, a storage system may be distributed, may be virtual, and/or may provide memory with varied latencies. In many conventional implementations, data is often stored in expensive, low-latency storage devices with capabilities that may exceed the needs of those accessing the data. Similarly, data is often stored in less expensive, higher-latency storage devices that may not suit the needs of those accessing the data. Additionally, data stored in the storage system may be attached to one or more processors such that it is readily accessible, or it may be detached for later use. However, data that is detached may often be stored in low latency memory, sometimes wasting valuable resources, for suboptimal periods of time. As such, finding improved ways to manage and/or place data continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
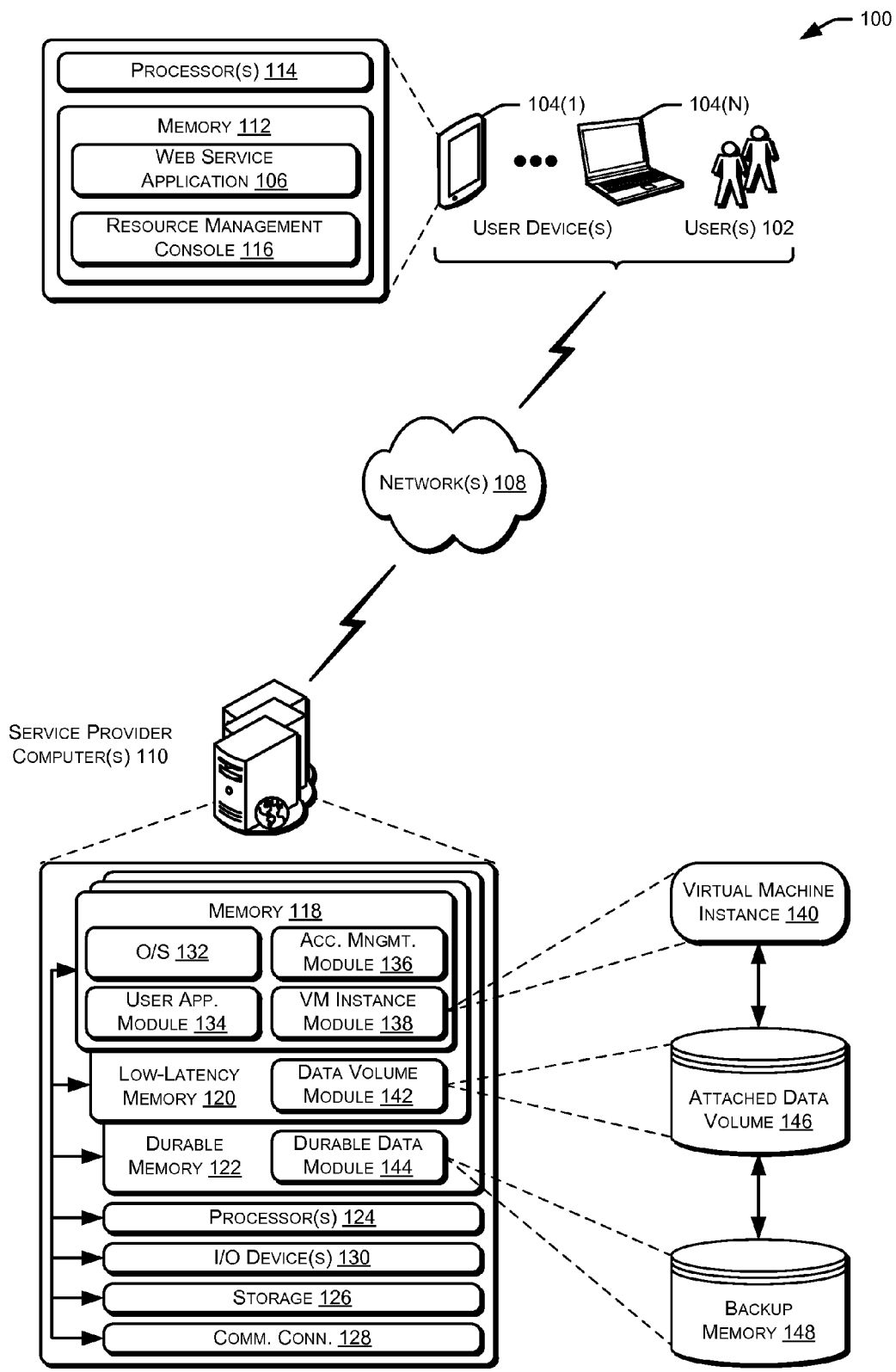
FIG. 1 illustrates an example architecture for triggering data placement that includes a service provider computer and one or more user devices connected via one or more networks, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing data storage, access, placement, and/or related services to client entities via a computing resource and/or service provider. As used herein, a client entity may include one or more virtual machine instances configured to access data of a distributed computing system (e.g., provided by the distributed system and acting on behalf of a client or user of the system). In some aspects, the service provider may provide storage, access, and/or placement of one or more computing resources through a service such as, but not limited to, a Web service. For example, a user or client entity may access, via the service provider, data storage and/or management such that access mechanisms may be implemented and/or provided to the client entity utilizing the computing resources. In some examples, computing resource services, such as those provided by the service provider, may include one or more computing resources accessible across one or more networks through user interfaces (UIs), application programming interfaces (APIs), and/or other interfaces where the one or more computing resources may be scalable and/or expandable as desired.

In some examples, the computing resources may be server computer systems in a distributed computing environment, although other computing resources are considered as being within the scope of the present disclosure, some examples of which are provided below. Additionally, in some examples, data may be stored, managed, placed, and/or otherwise accessed via the one or more server computer systems based at least in part on statistical triggers. For example, data associated with one or more client entities may be stored in the one or more server computer systems and the server computer systems may, in some examples, place, store, or otherwise move the data to other servers and/or to other memory locations or partitions within the one or more servers. As desired, the servers may move the data when it is determined that the data that has not been accessed for a certain amount of time and/or when it is determined that the data may not be accessed again for a certain amount of time. In other words, in some aspects, time may act as a statistical trigger for determining data placement, although other factors (e.g., data state, decay, behavior, etc.) may be considered as being within the scope of the present disclosure.

Additionally, in some aspects, a user or client may access a client entity of a distributed system for attaching data sets, data volumes, data blocks, or the like to the client entity for accessing, manipulating, and/or processing the data by the client entity. That is, a client entity may request that particular data volumes be operationally attached to the client entity. In some aspects, operationally attaching a data volume may include generating, storing, maintaining, and/or updating a mapping of data stored in the data volume such that the client entity may perform input and/or output (I/O) operations on the data. For example, data may be read from the attached data volume and/or written to the attached data volume by the client entity. According to some examples, data volumes that are attached may be stored in a relatively low latency type of memory such that the I/O operations performed on the data may be performed in a faster (i.e., lower latency) fashion.

Data volumes that are attached to client instances (i.e., client entities or virtual machine instances), in some examples, may be stored in one or more primary memory spaces (e.g., low latency memory) or in one or more backup memory spaces (e.g., high latency memory, durable memory, and/or other low latency memory). In some cases, the attached data volumes may be stored in both primary memory spaces and backup memory spaces. In this way, one or more layers of redundancy may help protect from data loss or corruption. Additionally, in some aspects, a user or client entity may request to detach a data volume when, for example, the user or client entity may not plan to access or otherwise perform I/O operations on the data volume for a foreseeable amount of time. For example, a data volume may include resources for operating a seasonal website or other service that operates periodically. Alternatively, or in addition, the data volume may include resources for application development that may be complete or otherwise no longer needed. As such, it may not be desirable to maintain attachment to the client entity at all times. Further, in some examples, a client instance may be taken down, removed, or otherwise deactivated such that it is no longer operational. In this case, attached data volumes may be detached as a matter of course. However, in some examples, although a data volume may be detached for one or more particular reasons, the data volume may continue to be stored in the low latency memory space and/or the backup memory space.

In some aspects, a service provider computer, such as a server operated by a financial institution, an online merchant, a news publication company, a web services company, a social networking company, or the like, may maintain and/or backup data volumes for one or more client entities of a distributed computing system. The service provider computer may also receive requests to backup data volumes associated with the client entities as well as requests to attach and/or detach data volumes to the client entities. Additionally, in some examples, the service provider may receive, determine, and/or otherwise collect statistical information associated with the data volumes in order to make data placement decisions regarding detached data volumes. For example, a user or a client entity (e.g., on behalf of a user) may request to detach one or more particular data volumes from the client entity. Once detached, the service provider may determine if or when it is appropriate to store data of the detached data volume in one or more different memory spaces. In one non-limiting example, the determination may be based at least in part on a time since the data volume was detached and, once that time has passed, data of the data volume may be backed up to a secondary memory space (e.g., a durable data store with higher latency than the memory used primarily for attached data volumes). Additionally, the determination, the backing-up of data volumes to a secondary memory space, and/or the placement of data may be transparent to the user and/or client entity.

In some examples, once data from a detached data volume has been stored elsewhere (i.e., moved to another memory space, server, memory architecture, etc.), the memory of the detached data volume may be de-allocated and/or reallocated such that the space previously occupied by the data of the detached volume may be available for storage of other data or unavailable for storage of any additional data. That is, the data associated with the detached volume may be effectively deleted (or moved) with or without actually deleting any data of the data volume. In other words, any data mapping to those particular locations may no longer indicate that those particular locations store the data that was moved (i.e., the data of the detached data volume). However, in some aspects, a data volume identifier (ID) (e.g., a data volume name, number, or other indicator) may be stored in one or more servers of the service provider. In this way, if the user and/or client entity later requests to re-attach the previously detached (and/or moved) data volume, a new data volume does not need to be created. In this case, the service provider may move the data associated with the detached data volume back into the low latency memory (again, in some aspects, transparently), assign the stored data volume ID to the data, and reattach the data volume to the client entity seamlessly and/or transparently. In other words, the user and/or client entity may not be made aware that the data was moved away from and/or back to the low latency memory as the data volume may be reattached to the client entity as quickly as if it had not been moved.

Moving the data of a detached data volume, data set, data block, memory space, etc., may, in some examples, be considered "shelving" the data. In some aspects, shelving data that has been detached may be beneficial to the server, to the client, and/or to the overall reliability and performance of the computing resource service. Additionally, in some examples, the shelving may be based at least in part on one or more statistical factors, models, or other approaches for determining when to shelve the data. In some examples data volumes may be shelved only after they have been detached from a client entity; however, in other examples, data volumes may be shelved at any time that the server or service provider determines is appropriate. Further, statistical factors for determining when to shelve data may include, but are not limited to, a time since detached, a probability of receiving a reattach request, a time since the last I/O operation was requested or performed, a half-life formulation, one or more exponential decay curves, an amount of money to be saved by a customer, an amount of low-latency memory space to be saved by shelving, global system information, information specific to a customer or data set, whether the data was part of a root volume or boot image, whether the data was added after booting, signals from the customer or client entity, information associated with metadata, tags, or flags of the data, combinations of the foregoing, or the like.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative system or architecture 100 in which techniques for providing statistically triggered data placement may be implemented. In architecture 100, one or more users 102 (i.e., account holders) may utilize user computing devices 104(1)-(N) (collectively, user devices 104) to access a web service application 106, or a user account accessible through the web service application 106, via one or more networks 108. In some aspects, the web service application 106 and/or user account may be hosted, managed, and/or provided by a computing resources service or service provider, such as by utilizing one or more service provider computers 110. The one or more service provider computers 110 may, in some examples, provide computing resources such as, but not limited, client entities, low latency data storage, durable data storage, data access, management, virtualization, etc. In some aspects, a client entity may be virtual and/or data volumes may be stored virtually within a distributed computing system operated by the one or more service provider computers 110. The one or more service provider computers 110 may also be operable to provide web hosting, computer application development and/or implementation platforms, and the like to the one or more users 102.

In some examples, the networks 108 may include any one or a combination of multiple different types of networks, such as cable networks, the Internet, wireless networks, cellular networks, and other private and/or public networks. While the illustrated example represents the users 102 accessing the web service application 106 over the networks 108, the described techniques may equally apply in instances where the users 102 interact with a service provider computer 110 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the web service application 106 may allow the users 102 to interact with a service provider computer 110, such as to store, access, and/or manage data, develop and/or deploy computer applications, and/or host web content. The one or more service provider computers 110, perhaps arranged in a cluster of servers or as a server farm, may host the web service application 106. Other server architectures may also be used to host the web service application 106. The web service application 106 may be capable of handling requests from many users 102 and serving, in response, various user interfaces that can be rendered at the user devices 104. The web service application 106 can be any type of website that supports user interaction, including social networking sites, online retailers, informational sites, blog sites, search engine sites, news and entertainment sites, and so forth. As discussed above, the described techniques can similarly be implemented outside of the web service application 106.

As noted above, the architecture 100 may include one or more user devices. The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 110 via the networks 108, or via other network connections.

In one illustrative configuration, the user devices 104 may include at least one memory 112 and one or more processing units (or processor(s)) 114. The processor(s) 114 may be implemented as appropriate in hardware, computer-executable instructions, firmware, or combinations thereof. Computer-executable instruction or firmware implementations of the processor(s) 114 may include computer-executable or machine-executable instructions written in any suitable programming language to perform the various functions described.

The memory 112 may store program instructions that are loadable and executable on the processor(s) 114, as well as data generated during the execution of these programs. Depending on the configuration and type of user device 104, the memory 112 may be volatile (such as random access memory (RAM)) and/or non-volatile (such as read-only memory (ROM), flash memory, etc.). The user device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 112 may include multiple different types of memory, such as static random access memory (SRAM), dynamic random access memory (DRAM), or ROM.

Turning to the contents of the memory 112 in more detail, the memory 112 may include an operating system and one or more application programs or services for implementing the features disclosed herein including at least a resource management console 116, such as a Web browser or dedicated application (e.g., a smart phone application, a tablet application, etc.)

and/or the web service application 106. The resource management console 116 may be configured to receive, store, and/or display a website or other interface for interacting with the service provider computers 110. Additionally, as noted above, the memory 112 may store access credentials and/or other user information such as, but not limited to, user IDs, passwords, and/or other user information. In some examples, the other client information may include information for authenticating an account access request such as, but not limited to, a device ID, a cookie, an IP address, a location, or the like. In addition, the other client information may include a user 102 provided response to a security question or a geographic location obtained by the user device 104.

Additionally, in some aspects, the resource management console 116 may allow a user 102 to interact with a web services account of the service provider computers 110. For example, the user 102 may request that computing resources be allocated to instantiate a client entity on behalf of the user 102. Further, the client instance may then be physically or virtually attached to one or more data stores via interaction between the user 102 and the resource management console 116. Also utilizing the resource management console 116, in some examples, a user 102 may request that snapshots (e.g., backup copies—described in further detail below) of attached data sets be stored in additional memory spaces. For example, a snapshot request may involve backing up one or more portions of data volumes or entire data volumes on behalf of the user 102. In some aspects, however, a snapshot may involve only storing a backup of data that has changed within a data set since the last snapshot, backup, or creation of the data set.

In some aspects, the service provider computers 110 may also be any type of computing devices such as, but not limited to, mobile, desktop, thin-client, and/or cloud computing devices, such as servers. In some examples, the service provider computers 110 may be in communication with the user devices 104 via the networks 108, or via other network connections. The service provider computers 110 may include one or more servers, perhaps arranged in a cluster, as a server farm, or as individual servers not associated with one another. These servers may be configured to host a website (or combination of websites) viewable via the user devices 104 or a Web browser accessible by a user 102. Additionally, in some aspects, the service provider computers 110 may be configured to perform statistically triggered data placement and/or data volume shelving as part of an integrated, distributed computing environment.

In one illustrative configuration, the service provider computers 110 may include at least one memory 118, at least one low-latency memory 120, at least one durable memory 122, and one or more processing units (or processor(s)) 124. The processor(s) 124 may be implemented as appropriate in hardware, computer-executable instructions, firmware, or combinations thereof. Computer-executable instruction or firmware implementations of the processor(s) 124 may include computer-executable or machine-executable instructions written in any suitable programming language to perform the various functions described.

The memory 118 may store program instructions that are loadable and executable on the processor(s) 124, as well as data generated during the execution of these programs. Depending on the configuration and type of service provider computers 110, the memory 118 may be volatile (such as random access memory (RAM)) and/or non-volatile (such as read-only memory (ROM), flash memory, etc.). The service provider computers 110 or servers may also include additional storage 126, which may include removable storage and/or non-removable storage. The additional storage 126 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 118 may include multiple different types of memory, such as static random access memory (SRAM), dynamic random access memory (DRAM), or ROM.

The memory 118, the additional storage 126, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 118 and the additional storage 126 are all examples of computer storage media.

The service provider computers 110 may also contain communications connection(s) 128 that allow the service provider computers 110 to communicate with a stored database, another computing device or server, user terminals, and/or other devices on the networks 108. The service provider computers 110 may also include input/output (I/O) device(s) 130, such as a keyboard, a mouse, a pen, a voice input device, a touch input device, a display, speakers, a printer, etc.

Turning to the contents of the memory 118 in more detail, the memory 118 may include an operating system 132 and one or more application programs or services for implementing the features disclosed herein including a user application module 134, an account management module 136, and/or a virtual machine instance module 138. The user application module 134 may be configured to generate, host, or otherwise provide the resource management console 116, and/or a website for accessing the resource management console 116 (e.g., the web service application 106), to users 102.

In some examples, the account management module 136 may be configured to maintain, or otherwise store, account information associated with requested resources, data, and/or services. The account information may include account holder information, the user ID, the password, acceptable answers to challenge questions, etc. In some aspects, the virtual machine instance module 138 may be configured to operate as a hypervisor or other virtualization system. For example, the virtual machine instance module 138 create, generate, instantiate, or otherwise provide one or more virtual machine instances 140 (i.e., a client entity of the distributed system) to a user 102 by providing one or more guest operating systems that may operate on behalf of the user 102. That is, in some examples, a user 102 may operate a virtual machine instance 140 as if the operations were being performed by one or more processors 114 of a user device 104. As such, the virtual machine instance 140 may be considered a client entity acting on behalf of user 102 and/or accessing data, data sets, data volumes, data blocks, etc., of the one or more service provider computers 110.

Additionally, in some examples, the one or more service provider computers 110 may include a low-latency memory 120 and/or a durable memory 122. The low-latency memory 120 and the durable memory 122 may include one or more application programs or services for implementing the features disclosed herein including a data volume module 142 and a durable data module 144, respectively. In some examples, as shown in FIG. 1, the data volume module 142 may be configured to implement, host, or otherwise manage data stored in a data volume 146, while the durable data module 144 may configured to implement, host, or otherwise manage data stored in a backup memory 148. As noted above, in some aspects, a user 102 may make requests for attaching and/or detaching data volumes 146 from one or more virtual machine instances 140 (i.e., client entities) and/or for backing up (e.g., taking a snapshot of) data of the attached data volumes 146. For example, a user may be an application programmer testing code using a virtual machine instance 140 and an attached data volume 146 of the service provider computers 110. In this non-limiting example, while the code is being tested, the user 102 may have the data volume 146 attached to the virtual machine instance 140 and may request that one or more I/O operations be performed on the attached data volume 146. During and/or after testing of the code, the user 102 may make one or more backup (e.g., snapshot) requests of the attached data volume 146. However, in some examples, once the testing is complete, the user 102 may request that the attached data volume 146 be detached from the virtual machine instance 140.

In some examples, after a data volume 146 has been detached, the service provider computers 110 may determine if and/or when to shelve the data volume 146 based at least in part on statistical data, information, factors, and/or triggers associated with the service provider computers 110, the user 102, the virtual machine instance 140, and/or the data volume 146. As described above, shelving a data volume 146 may include moving the data of the data volume 146 to a backup memory space (in some examples, the backup memory 148 or other high durability space) and storing the volume ID for later attachment. When the user 102 later requests to attach the volume, instead of creating a new volume in the low-latency memory 120, the data that has been shelved may be moved back to the low-latency memory 120 and re-assigned the previously stored data volume ID. In this way, data that may not be used for some time may be seamlessly and transparently shelved for later use. In some examples, this may provide greater flexibility to the computing resources service and/or greater cost savings to the user 102. For example, by transparently shelving (i.e., moving the data to and from archival storage without notifying or otherwise indicating such to the user 102), the user 102 may be able to refer to the volume (e.g., by its identifier) regardless of whether the volume was shelved or not. In this way, the user 102 may not need to make a different API call and/or change any programming in order to access the data, even when the data has been shelved. This transparency provides efficiency and/or cost saving advantages to both the system and the user 102.

Additionally, in some examples, the statistical triggers utilized to determine if and/or when to shelve the data volume 146 may include, but need not be limited to, how long the data volume has been detached, the probability (based at least in part on data volume statistics) that the data volume will stay detached, how long since the last I/O operation was performed and/or requested, a half-life function, an amount of data to be backed up (e.g., based at least in part on a percentage or other amount of the data volume that would need to be moved), an amount of money to be saved by the user 102, combinations of the foregoing, or the like. In some aspects, the statistical triggers may also include, but not are not limited to, determinations based on Markov chains, exponential curves, exponential decay functions, and/or multi-stated arrays. Statistical triggers may also be globally and/or locally measured. For example, local triggers may be based at least in part on data specific to the user 102 (e.g., past behavior and/or a request to shelve), the data volume 146 (e.g., root volumes, volumes that were not part of the boot image and/or were added after booting), and/or the data of the data volume 146 (e.g., the data itself, metadata, and/or tags). Further, in some examples, upon a detach command or request of a user 102, the service provider computers 110 may activate a flag and store the data volume 146 ID as a logical construct in a control plane. The volume ID may, in some examples, not be available in a data plane. A few examples of the operations of the service provider computers are described in greater detail below with reference to FIGS. 5-9.

Additional types of computer storage media that may be present in the service provider computers 110 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 110. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
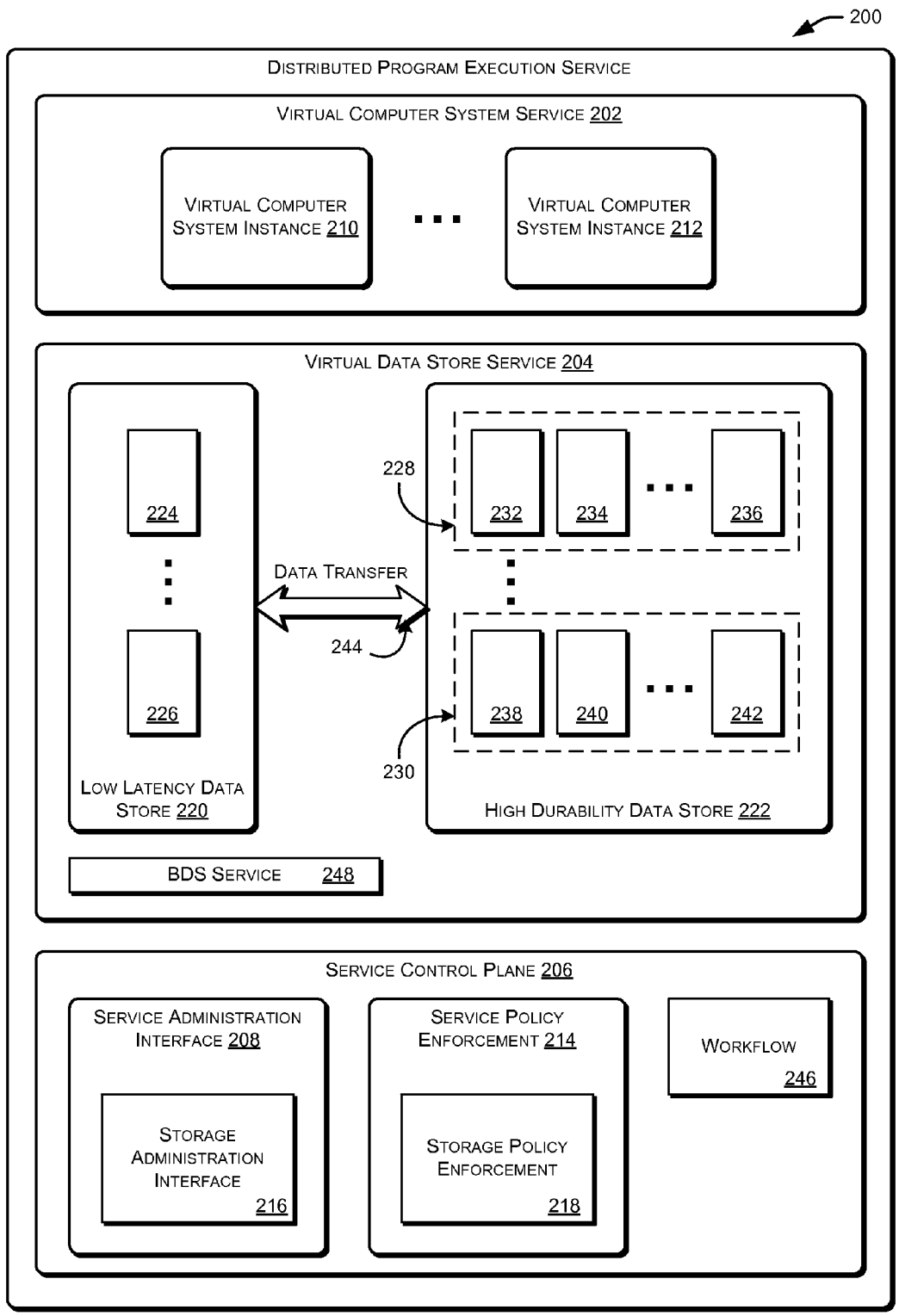
FIG. 2 illustrates an example architecture of a distributed program execution service that may be utilized to implement the drive health determination and data placement described herein, according to at least one example.

As noted, in at least one example, one or more aspects of the environment or architecture 100 may incorporate and/or be incorporated into a distributed program execution service such as that hosted by the service provider computers 110. FIG. 2 depicts aspects of an example distributed program execution service 200 in accordance with at least one example. The distributed program execution service 200 may provide virtualized computing services, including a virtual computer system service 202 and a virtual data store service 204, with a wide variety of computing resources interlinked by a relatively high speed data network. Such computing resources may include processors such as central processing units (CPUs), volatile storage devices such as RAM, nonvolatile storage devices such as flash memory, hard drives and optical drives, servers such as the service provider computers 110 described above with reference to FIG. 1, one or more data stores such as the data volume 140 of FIG. 1, as well as communication bandwidth in the interlinking network. The computing resources managed by the distributed program execution service 200 are not shown explicitly in FIG. 2 because it is an aspect of the distributed program execution service 200 to emphasize an independence of the virtualized computing services from the computing resources that implement them.

The distributed program execution service 200 may utilize the computing resources to implement the virtualized computing services at least in part by executing one or more programs, program modules, program components, and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 200 may supply computing resources elastically and/or on-demand, for example, associated with a per resource unit commodity-style pricing plan.

The distributed program execution service 200 may further utilize the computing resources to implement a service control plane 206 configured at least to control the virtualized computing services. The service control plane 206 may include a service administration interface 208. The service administration interface 208 may include a Web-based user interface configured at least to enable users and/or administrators of the virtualized computing services to provision, de-provision, configure, and/or reconfigure (collectively, "provision") suitable aspects of the virtualized computing services. For example, a user of the virtual computer system service 202 may provision one or more virtual computer system instances 210, 212. The user may then configure the provisioned virtual computer system instances 210, 212 to execute the user's application programs. The ellipsis between the virtual computer system instances 210 and 212 (as well as with other ellipses throughout this disclosure) indicates that the virtual computer system service 202 may support any suitable number (e.g., thousands, millions, and more) of virtual computer system instances although, for clarity, only two are shown.

The service administration interface 208 may further enable users and/or administrators to specify and/or re-specify virtualized computing service policies. Such policies may be maintained and enforced by a service policy enforcement component 214 of the service control plane 206. For example, a storage administration interface 216 portion of the service administration interface 208 may be utilized by users and/or administrators of the virtual data store service 204 to specify virtual data store service policies to be maintained and enforced by a storage policy enforcement component 218 of the service policy enforcement component 214. Various aspects and/or facilities of the virtual computer system service 202 and the virtual data store service 204 including the virtual computer system instances 210, 212, the low latency data store 220, the high durability data store 222, and/or the underlying computing resources may be controlled with interfaces such as application programming interfaces (APIs) and/or Web-based service interfaces. In at least one example, the control plane 206 further includes a workflow component 246 configured at least to interact with and/or guide interaction with the interfaces of the various aspects and/or facilities of the virtual computer system service 202 and the virtual data store service 204 in accordance with one or more workflows.

In at least one embodiment, service administration interface 208 and/or the service policy enforcement component 214 may create, and/or cause the workflow component 246 to create, one or more workflows that are then maintained by the workflow component 246. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 208. As another example, a policy enforcement workflow may be created from a policy enforcement workflow template configured with parameters by the service policy enforcement component 214.

The workflow component 246 may modify, further specify and/or further configure established workflows. For example, the workflow component 246 may select particular computing resources of the distributed program execution service 200 to execute and/or be assigned to particular tasks. Such selection may be based at least in part on the computing resource needs of the particular task as assessed by the workflow component 246. As another example, the workflow component 246 may add additional and/or duplicate tasks to an established workflow and/or reconfigure information flow between tasks in the established workflow. Such modification of established workflows may be based at least in part on an execution efficiency analysis by the workflow component 246. For example, some tasks may be efficiently performed in parallel, while other tasks depend on the successful completion of previous tasks.

The virtual data store service 204 may include multiple types of virtual data stores such as a low latency data store 220 and a high durability data store 222. For example, the low latency data store 220 may maintain one or more data sets 224, 226 which may be read and/or written (collectively, "accessed") by the virtual computer system instances 210, 212 with relatively low latency. The ellipsis between the data sets 224 and 226 indicates that the low latency data store 220 may support any suitable number (e.g., thousands, millions, and more) of data sets although, for clarity, only two are shown. For each data set 224, 226 maintained by the low latency data store 220, the high durability data store 222 may maintain a set of captures 228, 230. Each set of captures 228, 230 may maintain any suitable number of captures 232, 234, 236 and 238, 240, 242 of its associated data set 224, 226, respectively, as indicated by the ellipses. Each capture 232, 234, 236 and 238, 240, 242 may provide a representation of the respective data set 224 and 226 at particular moment in time. Such captures 232, 234, 236 and 238, 240, 242 may be utilized for later inspection including restoration of the respective data set 224 and 226 to its state at the captured moment in time. Although each component of the distributed program execution service 200 may communicate utilizing the underlying network, data transfer 244 between the low latency data store 220 and the high durability data store 222 is highlighted in FIG. 2 because the contribution to utilization load on the underlying network by such data transfer 244 can be significant.

For example, the data sets 224, 226 of the low latency data store 220 may be virtual disk files (i.e., file(s) that can contain sequences of bytes that represents disk partitions and file systems) or other logical volumes. The low latency data store 220 may include a low overhead virtualization layer providing access to underlying data storage hardware. For example, the virtualization layer of the low latency data store 220 may be low overhead relative to an equivalent layer of the high durability data store 222. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 220 and the high durability data store 222, respectively, are substantially disjoint. In a specific embodiment, the low latency data store 220 could be a Storage Area Network (SAN) target or the like. In this exemplary embodiment, the physical computer system that hosts the virtual computer system instance 210, 212 can send read/write requests to the SAN target.

The low latency data store 220 and/or the high durability data store 222 may be considered non-local and/or independent with respect to the virtual computer system instances 210, 212. For example, physical servers implementing the virtual computer system service 202 may include local storage facilities such as hard drives. Such local storage facilities may be relatively low latency but limited in other ways, for example, with respect to reliability, durability, size, throughput, and/or availability. Furthermore, data in local storage allocated to particular virtual computer system instances 210, 212 may have a validity lifetime corresponding to the virtual computer system instance 210, 212, so that if the virtual computer system instance 210, 212 fails or is de-provisioned, the local data is lost and/or becomes invalid. In at least one embodiment, data sets 224, 226 in non-local storage may be efficiently shared by multiple virtual computer system instances 210, 212. For example, the data sets 224, 226 may be mounted by the virtual computer system instances 210, 212 as virtual storage volumes.

Data stores in the virtual data store service 204, including the low latency data store 220 and/or the high durability data store 222, may be facilitated by and/or implemented with a block data storage (BDS) service 248, at least in part. The BDS service 248 may facilitate the creation, reading, updating, and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability, and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 248 may facilitate and/or implement local caching of data blocks as they are transferred through the underlying computing resources of the distributed program execution service 200 including local caching at data store servers implementing the low latency data store 220 and/or the high durability data store 222, and local caching at virtual computer system servers implementing the virtual computer system service 202. In at least one embodiment, the high durability data store 222 is an archive quality data store implemented independent of the BDS service 248. The high durability data store 222 may work with sets of data that are large relative to the data blocks manipulated by the BDS service 248. The high durability data store 222 may be implemented independent of the BDS service 248. For example, with distinct interfaces, protocols, and/or storage formats.

Each data set 224, 226 may have a distinct pattern of change over time. For example, the data set 224 may have a higher rate of change than the data set 226. However, in at least one embodiment, bulk average rates of change insufficiently characterize data set change. For example, the rate of change of the data set 224, 226 may itself have a pattern that varies with respect to time of day, day of week, seasonally including expected bursts correlated with holidays and/or special events, and/or annually. Different portions of the data set 224, 226 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 232 of the data set 224 may involve a substantially full copy of the data set 224 and transfer 244 through the network to the high durability data store 222 (may be a "full capture"). In a specific example, this may include taking a snapshot of the blocks that make up a virtual storage volume. Data transferred between the low latency data store 220 and high durability data store 222 may be orchestrated by one or more processes of the BDS service 248. As another example, a virtual disk (storage volume) may be transferred to a physical computer hosting a virtual computer system instance 210. A hypervisor may generate a write log that describes the data and location where the virtual computer system instance 210 writes the data. The write log may then be stored by the high durability data store 222 along with an image of the virtual disk when it was sent to the physical computer.

The data set 224 may be associated with various kinds of metadata. Some, none or all of such metadata may be included in a capture 232, 234, 236 of the data set 224 depending on the type of the data set 224. For example, the low latency data store 220 may specify metadata to be included in a capture depending on its cost of reconstruction in a failure recovery scenario. Captures 234, 236 beyond the initial capture 232 may be "incremental," for example, involving a copy of changes to the data set 224 since one or more previous captures. Changes to a data set may also be recorded by a group of differencing virtual disks which each comprise a set of data blocks. Each differencing virtual disk may be a parent and/or child differencing disk. A child differencing disk may contain data blocks that are changed relative to a parent differencing disk. Captures 232, 234, 236 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 234, 236, utilization load on the underlying computing resources can be significantly less for incremental captures compared to full captures.

For example, a capture 232, 234, 236 of the data set 224 may include read access of a set of servers and/or storage devices implementing the low latency data store 220, as well as write access to update metadata, for example, to update a data structure tracking "dirty" data blocks of the data set 224. For the purposes of this description, data blocks of the data set 224 are dirty (with respect to a particular class and/or type of capture) if they have been changed since the most recent capture (of the same class and/or type). Prior to being transferred 244 from the low latency data store 220 to the high durability data store 222, capture 232, 234, 236 data may be compressed and/or encrypted by the set of servers. At the high durability data store 222, received capture 232, 234, 236 data may again be written to an underlying set of servers and/or storage devices. Thus each capture 232, 234, 236 involves a load on finite underlying computing resources including server load and network load. It should be noted that, while illustrative embodiments of the present disclosure discuss storage of captures in the high durability data store 222, captures may be stored in numerous ways. Captures may be stored in any data store capable of storing captures including, but not limited to, low-latency data stores and the same data stores that store the data being captured.

Captures 232, 234, 236 of the data set 224 may be manually requested, for example, utilizing the storage administration interface 216. In at least one embodiment, the captures 232, 234, 236 may be automatically scheduled in accordance with a data set capture policy. Data set capture policies in accordance with at least one embodiment may be specified with the storage administration interface 216, as well as associated with one or more particular data sets 224, 226. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

Figure 3:
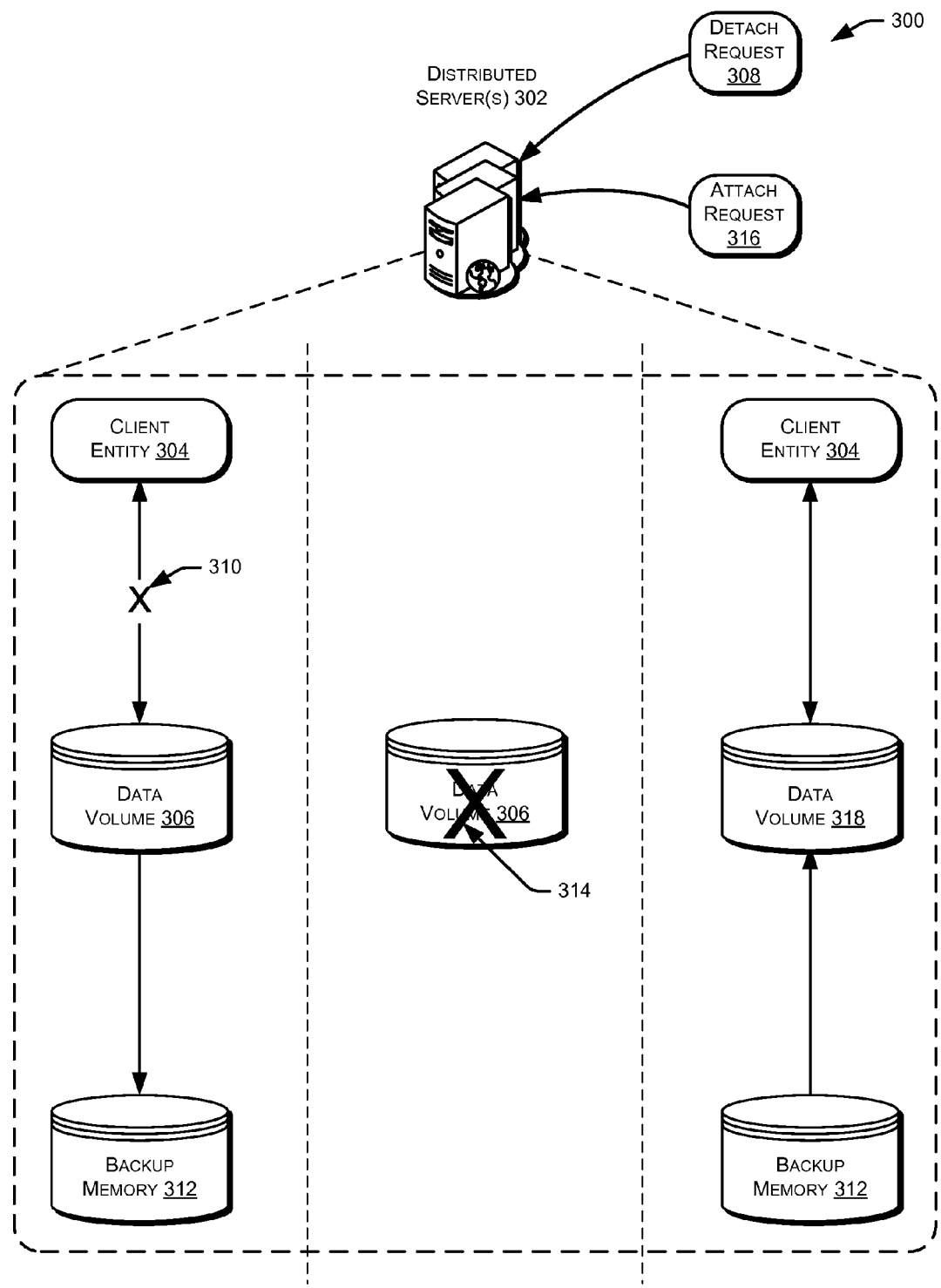
FIG. 3 illustrates an example block diagram for describing at least some features of the statistically triggered data placement described herein, according to at least one example.

FIG. 3 depicts an example block diagram 300 illustrating aspects and/or features of the example architecture 100 of FIG. 1 in which techniques for statistically triggered data placement may be implemented. In the block diagram 300, aspects of the disclosure are shown again with reference to one or more distributed servers 302 such as, but not limited to, the service provider computers 110 of FIG. 1. In some aspects a client entity 304 may be stored within, or otherwise hosted (e.g., as described above with reference to virtual computer instances) by the one or more distributed servers 302. Similarly, one or more data volumes 306 may be stored within a data store of the one or more distributed servers 302. Further, in some aspects, the data volume 306 may be attached (e.g., virtually attached) to the client entity 304. In this way, the client entity 304 may access the data volume 306, performing read requests, write requests, gets, puts, other I/O operations, or the like.

In one non-limiting example, the distributed servers 302 may receive a request, from the user 102 of FIG. 1 and/or the client entity 304 (e.g., on behalf of the user 102 of FIG. 1), to detach the data volume 308 from the client entity 304. Based at least in part on this request, and indicated by the small "X" 310, the distributed server 302 may detach the data volume 306 from the client entity 304. Further, based at least in part on received or otherwise collected information associated with the client entity 304, the data volume 306, and/or the distributed servers 302 (e.g., the system as a whole), the distributed servers 302 may determine to shelve the data associated with the data volume 306.

In some aspects, shelving the data associated with the data volume 306 may include storing (or otherwise moving) the data associated with the data volume 306 to a backup memory space 312 and/or storing a volume ID of the data volume 306 in a control plane (e.g., accessible by the hypervisor or virtual machine manager). Shelving the data may also include deleting the data of the data volume 306 or otherwise de-allocating space of the data volume 306 such that the space of the data volume 306 may be available for use other than maintenance of the data volume 306. That is, a reference to the location of data within the data volume 306 may be deleted or otherwise de-referenced and/or the space may be de-allocated and/or reallocated such that the data of that space is no longer accessible. This may be indicated, in FIG. 3, by the large "X" 314. In at least this example, the data may be backed up; however, it may no longer be accessed by the client entity 304.

In some examples, however, the user 102 of FIG. 1 and/or the client entity 304 may provide an attachment (or re-attachment) request 316 to the distributed servers 302. In this way, the user 102 or client entity 304 may be able to once again access or otherwise manage the data of the previously attached data volume 306. Upon receipt of the attach request 316, the distributed servers 302 may move the data of the backup memory 312 back into a lower latency memory to form the data volume 318. Additionally, in some aspects, the volume ID used for the data volume 306 may be retrieved from the control plane and used as the new volume ID for the newly created data volume 318. The data volume 318 may then be attached to the client entity 304 after (or during) transfer of the data from the backup memory 312 to the data volume 318.

Figure 4:
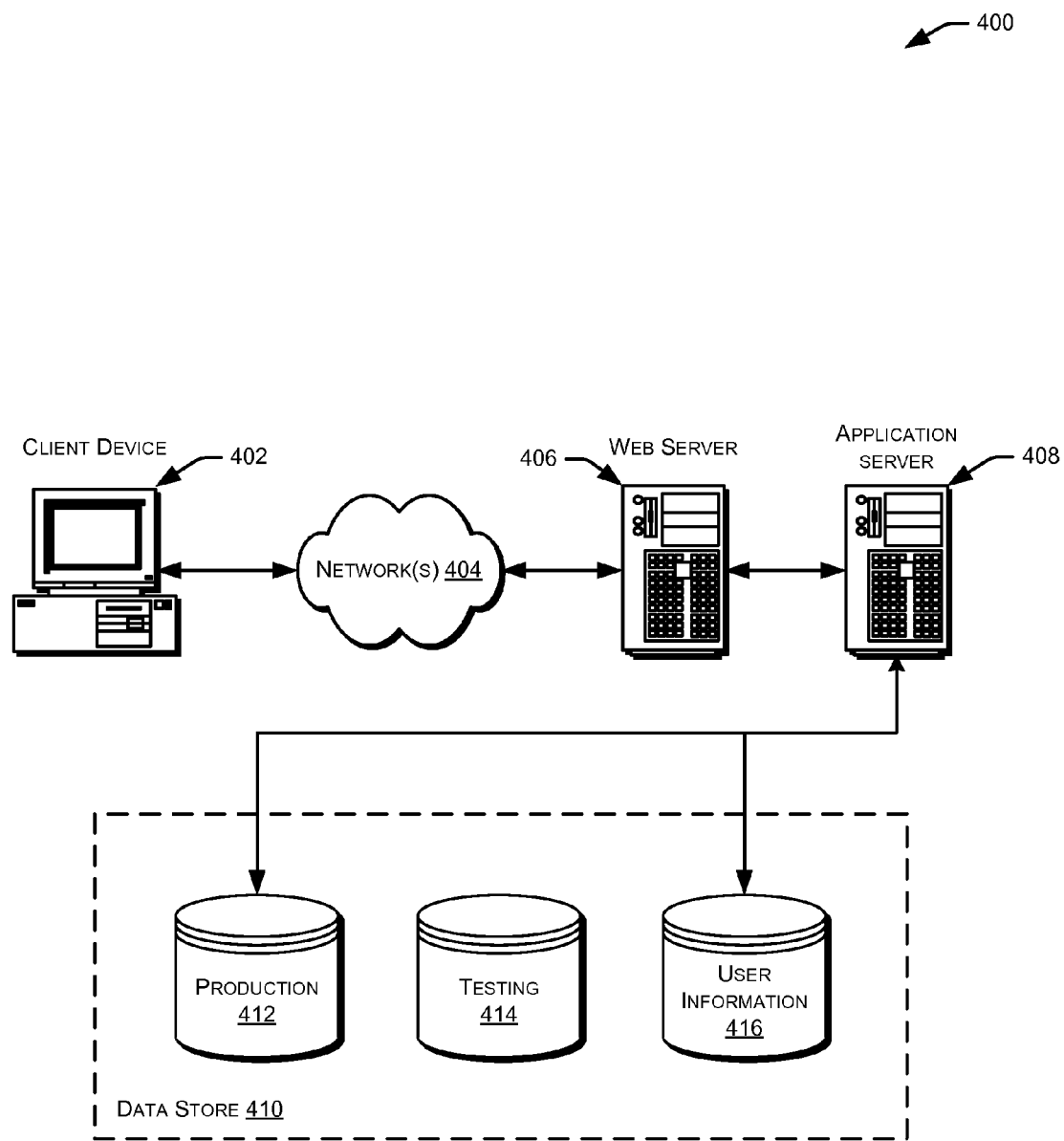
FIG. 4 illustrates an example block diagram of at least one environment in which various embodiments of features described herein can be implemented, according to at least one example.

FIG. 4 illustrates aspects of an example environment 400 for implementing aspects in accordance with various embodiments. As will be appreciated, although a Web-based environment is used for purposes of explanation, different environments may be used, as appropriate, to implement various embodiments. The environment includes an electronic client device 402, which can include any appropriate device operable to send and receive requests, messages, or information over an appropriate network 404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 406 for receiving requests and serving content in response thereto, although for other networks an alternative device serving a similar purpose could be used as would be apparent to one of ordinary skill in the art.

The illustrative environment includes at least one application server 408 and a data store 410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and computer-executable instructions for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 402 and the application server 408, can be handled by the Web server. It should be understood that the Web and application servers are not required and are merely example components, as structured code discussed herein can be executed on any appropriate device or host machine as discussed elsewhere herein.

The data store 410 can include several separate data tables, databases, or other data storage mechanisms and media for storing data relating to a particular aspect. For example, the data store illustrated includes mechanisms for storing production data 412 and user information 416, which can be used to serve content for the production side. The data store also is shown to include a mechanism for storing log data 414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 410. The data store 410 is operable, through logic associated therewith, to receive instructions from the application server 408 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 402. Information for a particular item of interest can be viewed in a dedicated page or window of the browser.

Each server typically may include an operating system that provides executable program instructions for the general administration and operation of that server, and typically may include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 4. Thus, the depiction of the system 400 in FIG. 4 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile applications and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a SAN familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one CPU, at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically may include a number of computer-executable applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, computer instructions (including portable applications, such as applets), or both. Further, connection to other computing devices such as network input/output devices may be employed.

Storage media and computer readable media for containing code, or portions of code, can include any appropriate media known or used in the art, including storage media and communication media, such as but not leveled to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Further, the example architectures, tools, and computing devices shown in FIGS. 1-4 are provided by way of example only. Numerous other operating environments, system architectures, and device configurations are possible. Accordingly, embodiments of the present disclosure should not be construed as being limited to any particular operating environment, system architecture, or device configuration.

Illustrative Processes

FIGS. 5-9 illustrate example flow diagrams showing respective processes 500, 600, 700, 800, and 900 for providing statistically triggered data placement. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 5:
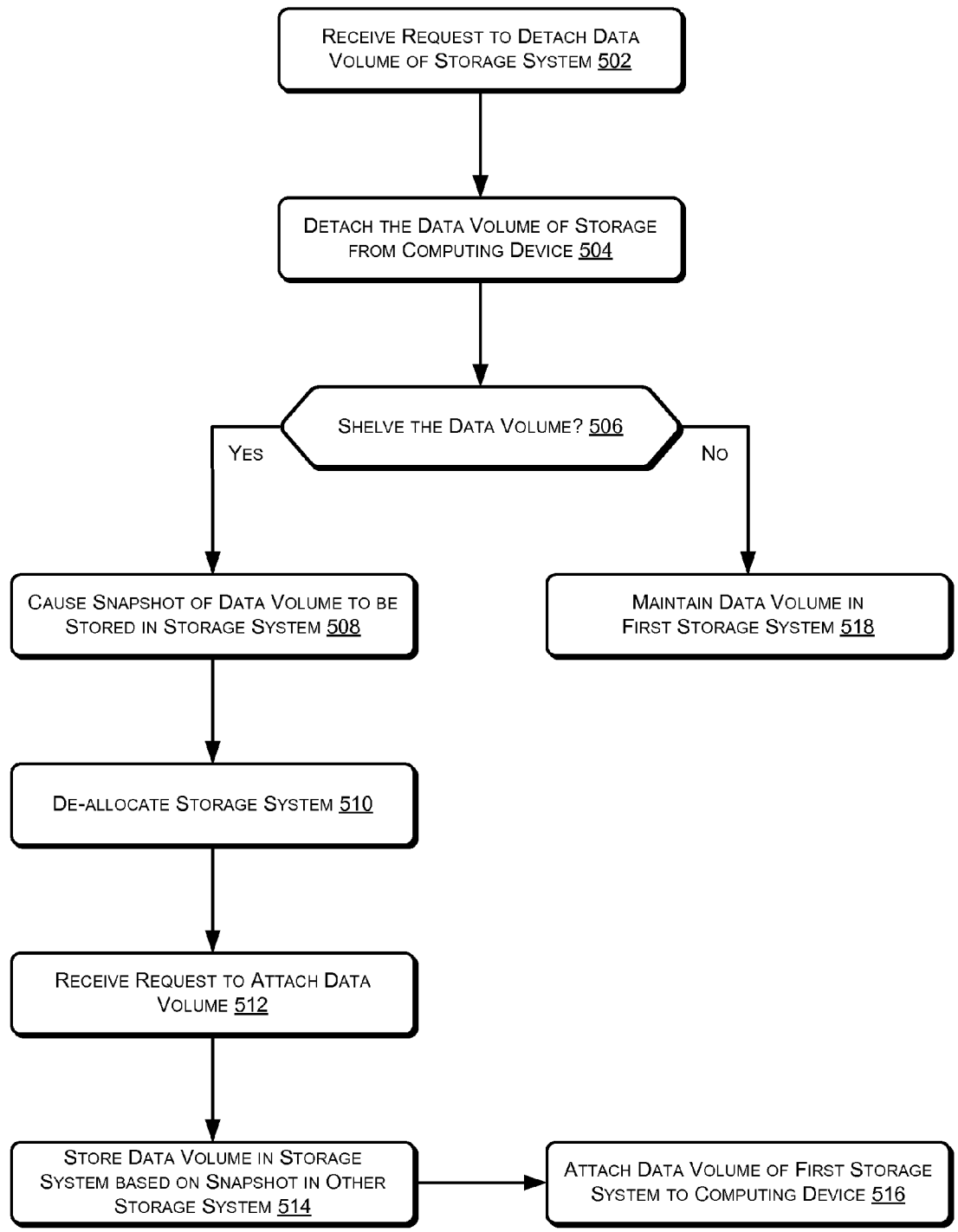
FIG. 5-9 illustrate example flow diagrams of processes for implementing at least some features of the statistically triggered data placement described herein, according to at least a few examples.

In some aspects, the process 500 of FIG. 5 may be performed by the one or more service provider computers 110 shown in FIG. 1 and/or the one or more distributed servers 302 of FIG. 3. The process 500 may begin by receiving a request to detach a data volume of a storage system at 502. As noted above, in some examples, the data volume may be a virtual data volume. Additionally, in some examples, the data volume may be part of a block storage and/or elastic storage architecture. The request may be made by a user of the distributed servers 302 and/or a client entity (e.g., a virtual processor or machine) that may be attached to the data volume in question. At 504, the process 500 may detach the data volume from the computing device (e.g., the client entity). The process 500 may then determine whether to shelve the data volume at 506. Determining whether to shelve the data volume may involve assessing one or more statistical factors such as, but not limited, triggers that may indicate whether the data volume should be shelved. For example, some statistical triggers may indicate that the data volume is not likely to be accessed again or at least not for a predetermined period of time. If that predetermined period of time is relatively long, the process 500 may determine to shelve the data volume in order to free up resources for data that may be accessed more often.

If it is determined to shelve the data volume at 506, the process 500 may then cause a snapshot of the data volume to be stored in another storage system at 508. That is, the entire data volume may be backed up to another storage system, or only portions that have changed since the last snapshot or backup may be backed up to another storage system. At 510, the process 500 may de-allocate the storage system associated with the data that is being shelved. As noted above, de-allocating the storage system (or storage space) may involve deleting the data, making the data inaccessible, and/or assigning the space to other data. Further, de-allocating the space may include making the data of the de-allocated space available for any data other than the data that is being shelved. In some examples, the process 500 may, at some point, receive a request to attach the data volume at 512. That is, the request may be associated with re-attaching the data was previously shelved. At 514, the process 500 may store the data volume (e.g., the data that was shelved) in the original (or similar type of) storage system based at least in part on the snapshot that was taken when the data was shelved. Additionally, the volume ID that was originally used with the data volume before it was shelved may, in some examples, be utilized again to re-reference the data. The process may then end at 516 by attaching the data volume to the computing device (e.g., the client entity). Alternatively, if the process 500 had determined to not shelve the data at 506, the process 500 may have ended at 518 by maintaining the detached data volume in the storage system.

Figure 6:
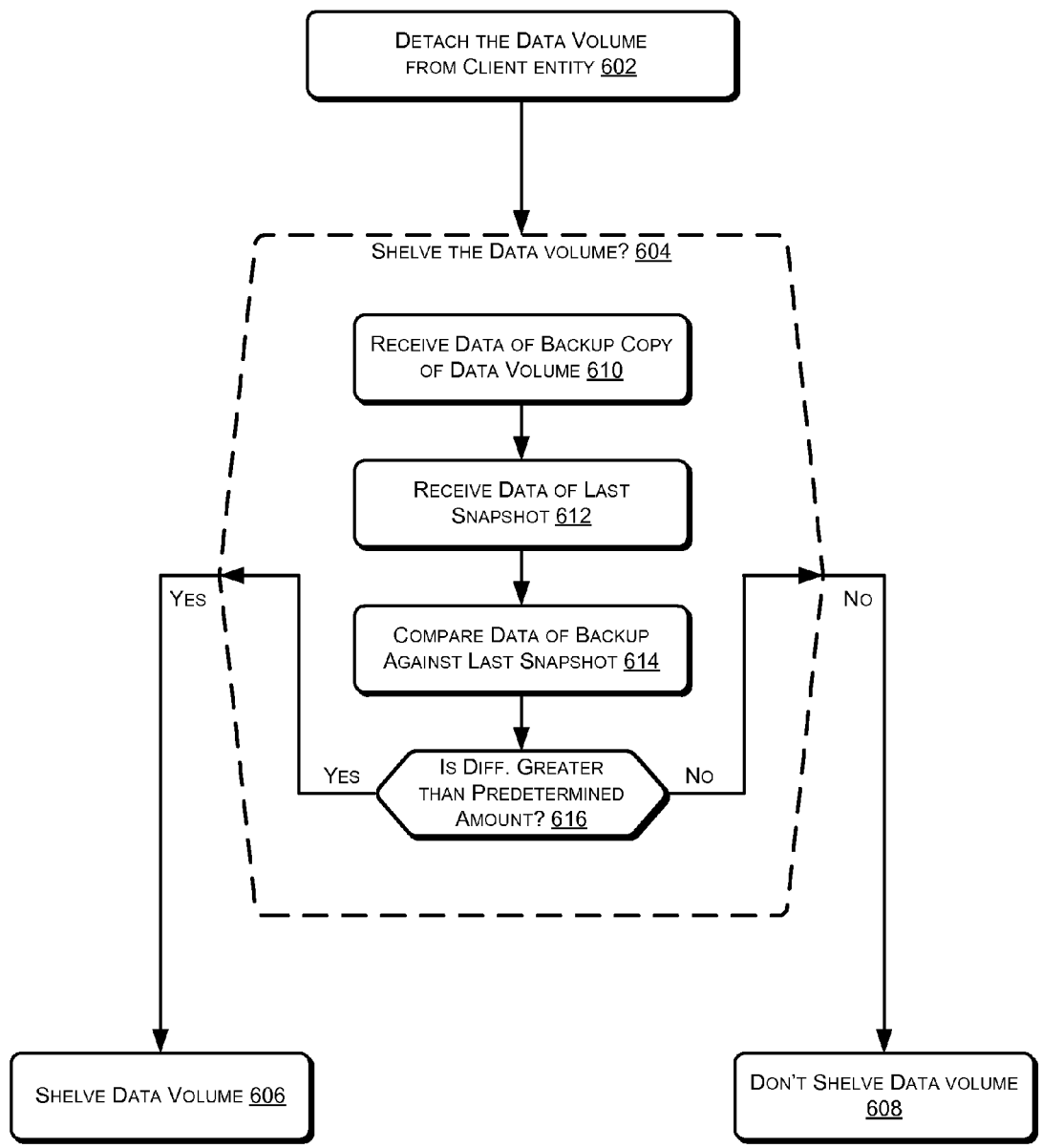

FIG. 6 illustrates an example flow diagram showing process 600 for providing features of statistically triggered data placement. In some aspects, the process 600 of FIG. 6 may be performed by the one or more service provider computers 110 shown in FIG. 1 and/or the one or more distributed servers 302 of FIG. 3. The process 600 may begin by detaching a data volume from a client entity at 602. The process 600 may then determine whether to shelve the data volume at 604 (indicated by the large dashed area). When the process 600 determines to shelve the data volume, the process 600 may end at 606 by shelving the data volume. On the other hand, when it is determined to not shelve the data volume at 604, the process 600 may end at 608 by not shelving the data volume.

As noted above, determining when to shelve a data volume may be based at least in part on one or more of several factors and/or triggers. For example, the decision to shelve a data volume may be based on receiving request to shelve the data volume. In at least one non-limiting example, the determination at 604 may be based at least in part on comparing an amount (or percentage) of data that has already been backed up (e.g., how much of the most recent snapshot already exists in a backup of the data). In this example, the process 600 may receive data associated with a backup copy of the data volume at 610. For example, the entire volume that is currently backed up may be received, or at least one section or subset of the backed-up data may be received. At 612, the process 600 may receive data associated with the last snapshot. That is, the process 600 may receive the data of the data volume that has changed since the last backup. The process 600 may then compare the backup copy of the data with the snapshot data at 614. At 616, the process 600 may determine, based at least in part on the comparison, whether the difference between the backup and the snapshot is greater than a predetermined amount. In some cases, the predetermined amount is a percentage of the total data volume and/or a raw data size indicating how much data may be requested to be moved in order to shelve the volume. In at least one aspect, the process 600 may determine to shelve the data only when there is a large percentage or amount of data to shelve. Alternatively, in some aspects, it may be desirable to shelve the data only when there is a small amount or percentage of the data to shelve. As such, if the difference and/or amount of data to be shelved is above the predefined amount, the process 600 may end at 606 by shelving the data. However, if not, the process 600 may end at 608 by not shelving the data.

Figure 7:
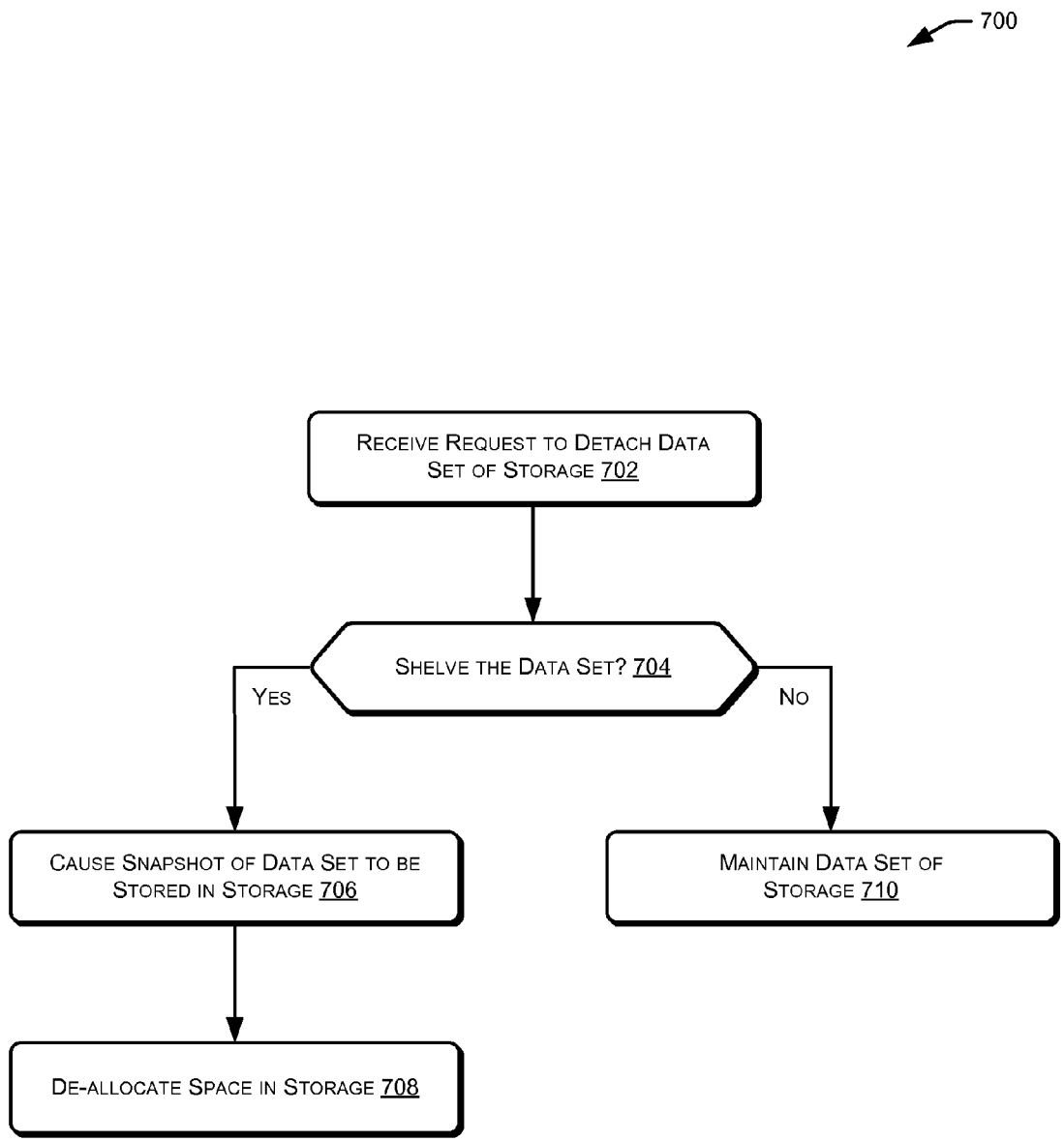

FIG. 7 illustrates an example flow diagram showing process 700 for providing features of statistically triggered data placement. In some aspects, the process 700 of FIG. 7 may be performed by the one or more service provider computers 110 shown in FIG. 1 and/or the one or more distributed servers 302 of FIG. 3. The process 700 may begin by receiving a request to detach a data set of a storage device at 702. At 704, the process 700 may determine, based at least in part on one or more statistical triggers, whether to shelve the data. If it is determined to shelve the data, the process 700 may cause a snapshot of the data set to be stored in another storage device at 706. The process 700 may then end at 708 by de-allocating space of the storage device that was shelved. However, if the process 700 determines at 704 not to shelve the data set, the process 700 may end at 710 by maintaining the data set in the storage device.

Figure 8:
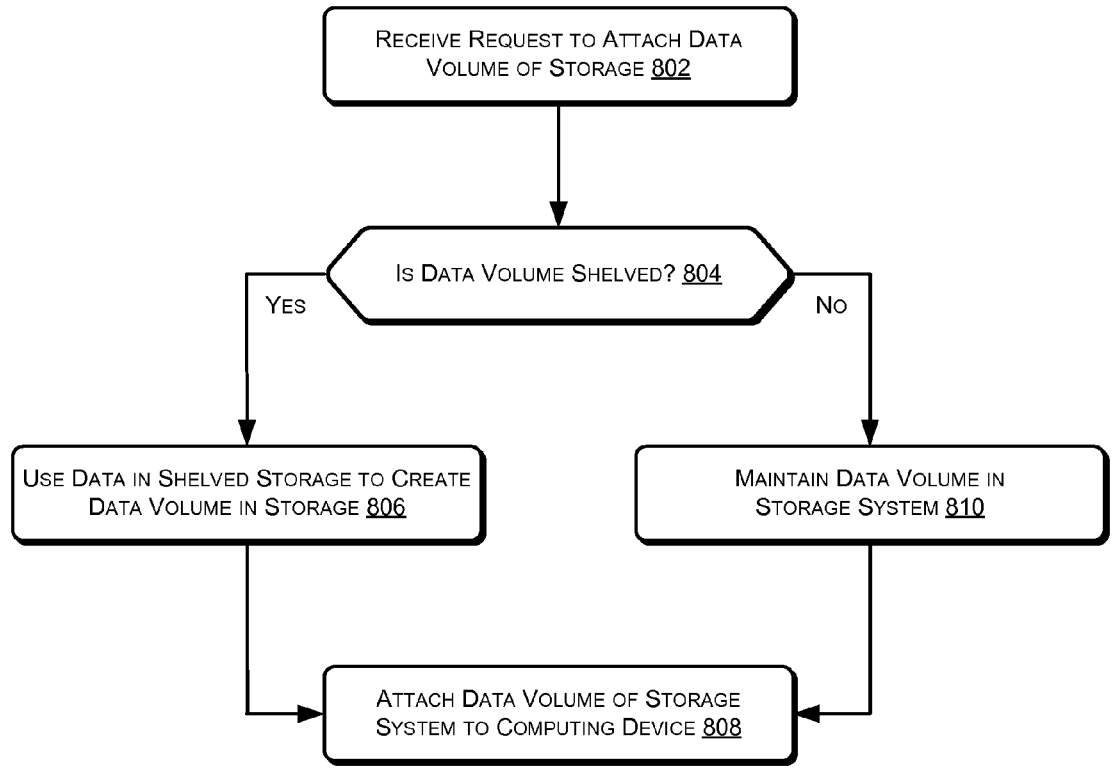

FIG. 8 illustrates an example flow diagram showing process 800 for providing features of statistically triggered data placement. In some aspects, the process 800 of FIG. 8 may be performed by the one or more service provider computers 110 shown in FIG. 1 and/or the one or more distributed servers 302 of FIG. 3. The process 800 may begin by receiving a request to attach a data volume of a storage device at 802. At 804, the process 800 may determine whether the data volume is (or was previously) shelved. If the data volume was shelved, the process 800 may use data of the shelved volume to create a new data volume in the storage device at 806. The process 800 may then end at 808 by attaching the newly created data volume to a computing device (e.g., a client entity). Alternatively, if the process 800 determines at 804 that the data volume has not been shelved, the process may maintain the data volume in the storage device at 810 and then end at 808 by attaching the original data volume (i.e., the data volume that was not shelved).

Figure 9:
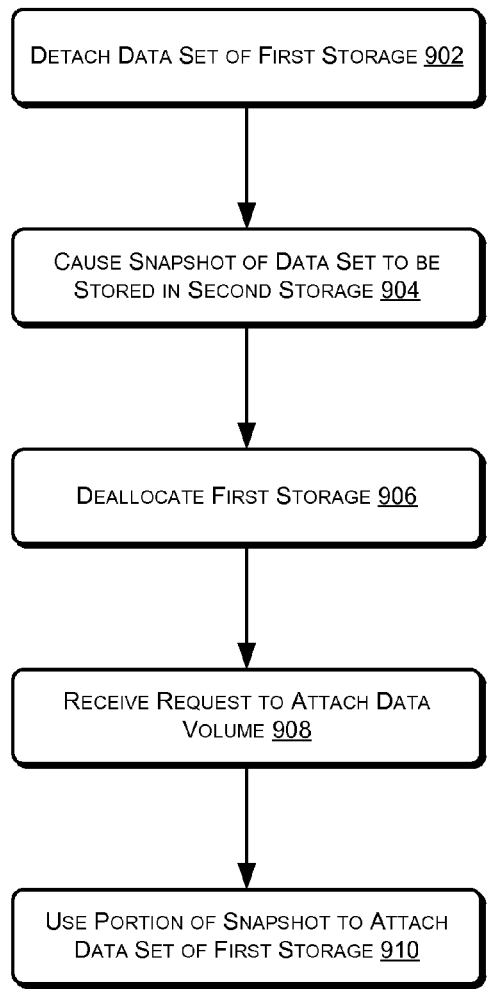

FIG. 9 illustrates an example flow diagram showing process 900 for providing features of statistically triggered data placement. In some aspects, the process 900 of FIG. 9 may be performed by the one or more service provider computers 110 shown in FIG. 1 and/or the one or more distributed servers 302 of FIG. 3. The process 900 may begin by detaching a data set of a first storage from a client entity or other computing device at 902. In some aspects, the first storage may be a low-latency memory space. Additionally, the first storage may be a virtual memory drive. At 904, the process 900 may cause a snapshot of the data set to be stored in a second storage. In some examples, the second storage may a higher durability storage space. Additionally, the process 900 may de-allocate space of the first storage such that the data set may not be accessed and/or maintained at 906. The process, at 908, may then receive a request to attach the data volume. Based at least in part on this request, the process 900 may then end at 910 by using at least a portion of the snapshot to attach the data set of the first storage to the client entity or other computing device.

Illustrative methods and systems for providing statistically triggered data placement are described above. Some or all of these systems and methods may, but need not, be implemented at least partially by architectures such as those shown in FIGS. 1-9 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method for data storage management, comprising:
    under control of one or more computer systems configured with executable instructions,
        receiving a request to detach a data volume from a computing device, the data volume having storage space allocated to the data volume in a first storage system and having a data volume identifier;
        detaching the data volume from the computing device based at least in part on the received request;
        subsequent to said detaching, determining, based at least in part on a triggering event signal, whether to shelve the detached data volume;
        when it is determined to shelve the detached data volume:
            causing a snapshot of the detached data volume to be stored in a second storage system; and
            de-allocating the storage space in the first storage system such that the storage space is available for use other than maintenance of the detached data volume; and
        upon receipt of an attachment request referencing the data volume identifier and a particular computing device, reconstructing the data volume associated with the data volume identifier in the first storage system using the stored snapshot;
        assigning the data volume identifier to the reconstructed data volume; and
        attaching the reconstructed data volume to the particular computing device.

2. The computer-implemented method of claim 1, wherein the triggering event signal comprises at least one of a request to shelve the data volume, an indication that a predefined time has passed since the data volume was detached, an indication that a predefined time has passed since the data volume was accessed by the computing device, or an indication of a probability above a predefined amount that the data volume will not be accessed by or re-attached to the computing device.

3. The computer-implemented method of claim 2, wherein the determination is based at least in part on at least one of a number of changes to the data volume since a last snapshot, a cost associated with shelving the data volume, or a performance specification associated with an amount of time to re-attach the data volume.

4. The computer-implemented method of claim 1, wherein the attachment request is received via a same application programming interface call independent of whether the data volume was shelved.

5. The computer-implemented method of claim 1, further comprising using the snapshot stored in the second storage system to store the data volume in the first storage system prior to attaching the data volume.

6. The computer-implemented method of claim 1, wherein the computing device comprises a virtual machine instance.

7. A computer-implemented method for data storage management, comprising:
under control of one or more computer systems configured with executable instructions,
receiving a request to detach a data set from a computing device, the data set having storage space allocated to the data set in a first storage system;
subsequent to detaching the data set, determining, based at least in part on a triggering event signal, whether to shelve the detached data set; and
when it is determined to shelve the detached data set:
causing at least a portion of the detached data set to be stored in a second storage system; and
de-allocating the storage space in the first storage system such that the storage space is available for use other than maintenance of the detached data set.

8. The computer-implemented method of claim 7, wherein a first snapshot of the data set is stored in the second storage system, based on a snapshot request, prior to receiving the request to detach the data set.

9. The computer-implemented method of claim 7, wherein the data set comprises a storage volume having a data volume identifier.

10. The computer-implemented method of claim 9, further comprising using one or more portions of the data set to attach the storage volume to a particular computing device upon receipt of an attachment request referencing the data volume identifier and the particular computing device.

11. The computer-implemented method of claim 7, wherein the triggering event signal comprises at least one of a request to shelve the data set, an indication that a predefined time has passed since the data set was detached, an indication that a predefined time has passed since the data set was accessed by the computing device, or an indication of a probability above a predefined amount that the data set will not be accessed by or re-attached to the computing device.

12. The computer-implemented method of claim 7, wherein the first storage system and the second storage system are part of a distributed computing system.

13. A system for data storage management, comprising:
at least one memory that stores computer-executable instructions;
at least one processor configured to access the at least one memory, wherein the at least one processor is configured to execute the computer-executable instructions to:
detach a data collection from a computing device, the data collection having storage space allocated to the data collection in a first memory system;
subsequent to said detach the data collection, determine, based at least in part on a triggering event signal, when to reconfigure the detached data collection;
store at least a portion of the detached data collection in a second storage system; and
de-allocate the storage space in the first storage system associated with the detached data collection.

14. The system of claim 13, wherein the at least one processor is further configured to execute the computer executable instructions to detach the data collection from the computing device based at least in part on a detachment request.

15. The system of claim 13, wherein the at least one processor is further configured to execute the computer executable instructions to:
receive a request to attach the data collection to the computing device; and
further reconfigure the data collection, comprising computer-executable instructions to use one or more stored portions of the data collection to reconstruct the data collection in the first memory system and attach the reconstructed data collection of the first memory system to the computing device.

16. The system of claim 15, wherein the data collection comprises a data volume with associated volume identifier, and wherein the at least one processor is further configured to execute the computer executable instructions to maintain the volume identifier of the data volume upon attachment.

17. The system of claim 13, wherein the triggering event signal comprises at least one of a request to shelve the data volume, an indication that a predefined time has passed since the data volume was detached, an indication that a predefined time has passed since the data volume was accessed by the computing device, or an indication of a probability above a predefined amount that the data volume will not be accessed by or re-attached to the computing device.

18. The system of claim 13, wherein the attachment request is received via a same application programming interface call independent of whether the data volume was shelved.

19. One or more non-transitory computer-readable media collectively storing computer-executable instructions for data storage management that, when executed by one or more processors, configures the one or more processors to perform operations comprising:
detaching a data set from a computing device, the data set having storage space allocated to the data set in a storage system and having an identifier used by the storage system;
subsequent to said detaching, causing a snapshot of the detached data set to be stored in an archival system;
de-allocating the storage space in the storage system such that the storage space is available for use other than maintenance of the detached data set; and
upon receipt of an attachment request referencing the identifier and a particular computing device, using the snapshot to attach the data set to the particular computing device.

20. The one or more computer-readable media of claim 19, the operations further comprising:
storing, in the storage system, a data set associated with the snapshot that is stored in the archival system; and
attaching the data set in the storage system to the particular computing device.

21. The one or more computer-readable media of claim 19, wherein a memory of the storage system comprises a lower latency than a memory of the archival system.

22. The one or more computer-readable media of claim 19, wherein the computing device comprises at least a virtual machine instantiated within a distributed computing system.

23. The one or more computer-readable media of claim 19, the operations further comprising determining when to de-allocate the storage space in the storage system based at least in part on a triggering event signal, and wherein the triggering event signal comprises at least one of a request to detach the data set, an indication that a predefined time has passed since the data set was detached, an indication that a predefined time has passed since the data set was accessed by the computing device, or an indication of a probability below a predefined amount that the data set will be accessed by or re-attached to the particular computing device.

24. The one or more computer-readable media of claim 23, wherein the determination is based at least in part on at least one of a number of changes to the data set since a last snapshot, a cost associated with shelving the data set, or a performance request associated with an amount of time to re-attach the data set.

25. The one or more computer-readable media of claim 19, wherein the snapshot of the data set is caused to be stored based at least in part on a request to detach the data set from the computing device.

26. The one or more computer-readable media of claim 19, wherein the storage system and the archival system are from different storage services that have different capabilities.

* * * * *